(12) United States Patent
Hammond

(10) Patent No.: US 12,256,868 B2
(45) Date of Patent: Mar. 25, 2025

(54) PERFECT COOKER FOR HYDRATED MILLED VEGETABLES

(71) Applicant: David Nii Ayitey Hammond, Silver Spring, MD (US)

(72) Inventor: David Nii Ayitey Hammond, Silver Spring, MD (US)

( * ) Notice: Subject to any disclaimer, the term of this patent is extended or adjusted under 35 U.S.C. 154(b) by 2 days.

(21) Appl. No.: 18/347,806

(22) Filed: Jul. 6, 2023

(65) Prior Publication Data

US 2024/0008688 A1    Jan. 11, 2024

Related U.S. Application Data

(60) Provisional application No. 63/358,940, filed on Jul. 7, 2022.

(51) Int. Cl.
| | |
|---|---|
| *A47J 44/00* | (2006.01) |
| *A21C 1/02* | (2006.01) |
| *A21C 3/00* | (2006.01) |

(52) U.S. Cl.
CPC .............. *A47J 44/00* (2013.01); *A21C 1/02* (2013.01); *A21C 3/00* (2013.01)

(58) Field of Classification Search
CPC .... A21C 3/00; A21C 9/08; A21C 1/02; A21C 11/00; A47J 44/00; A01J 25/005; A01J 25/00; A01J 25/008; A01J 25/12
USPC ......... 99/330, 452, 453, 454, 460, 464, 489, 99/494, 516, 535
See application file for complete search history.

(56) References Cited

U.S. PATENT DOCUMENTS

2012/0034360 A1\*  2/2012  Israni .................. A21C 1/1425
                                                                    700/206

\* cited by examiner

*Primary Examiner* — Phuong T Nguyen

(57) ABSTRACT

A method and apparatus for cooking food products collectively called Codou (cooked dough) from hydrated milled vegetables, water, optional salt; and wrapping material (for enhanced taste, and containment). The process undergoes three stages: (a) pre-cooking in the Cooking Mixture; (b) shaping and wrapping from the Sliding Tray using the Shaper/Wrapper unit; and (c) boiling in water in the Boiler unit. This apparatus being microprocessor-controlled allows for various types of the Codou to be cooked at the touch of a button. The process ensures that each type of Codou is cooked to a consistent texture, taste, look, and feel.

9 Claims, 8 Drawing Sheets

Composite Diagram - Housing Unit and Components

Figure 1: Composite Diagram - Housing Unit and Components
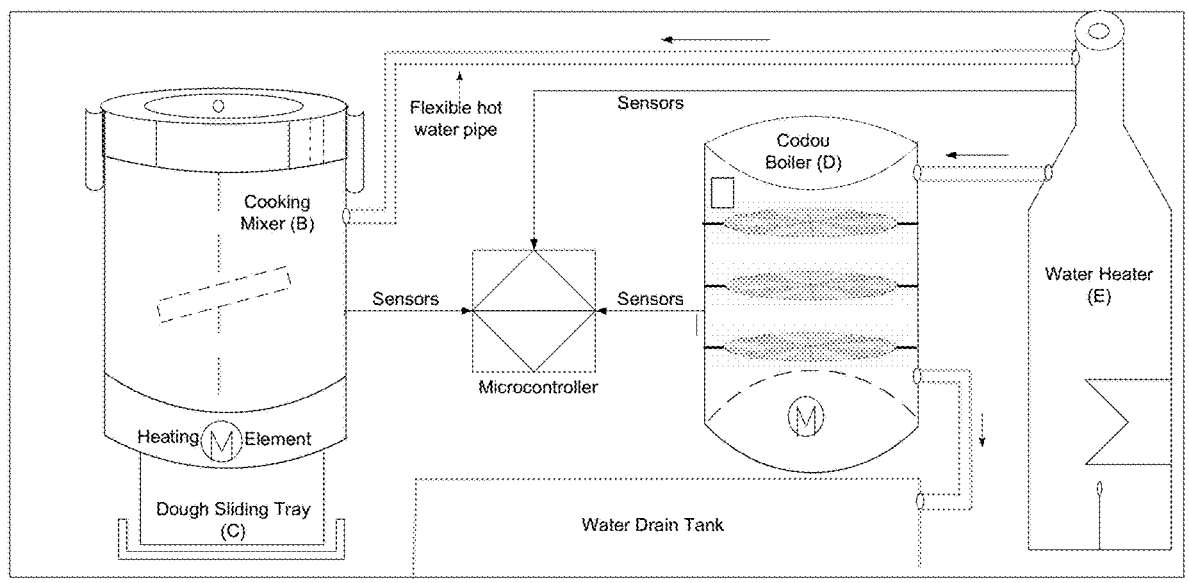

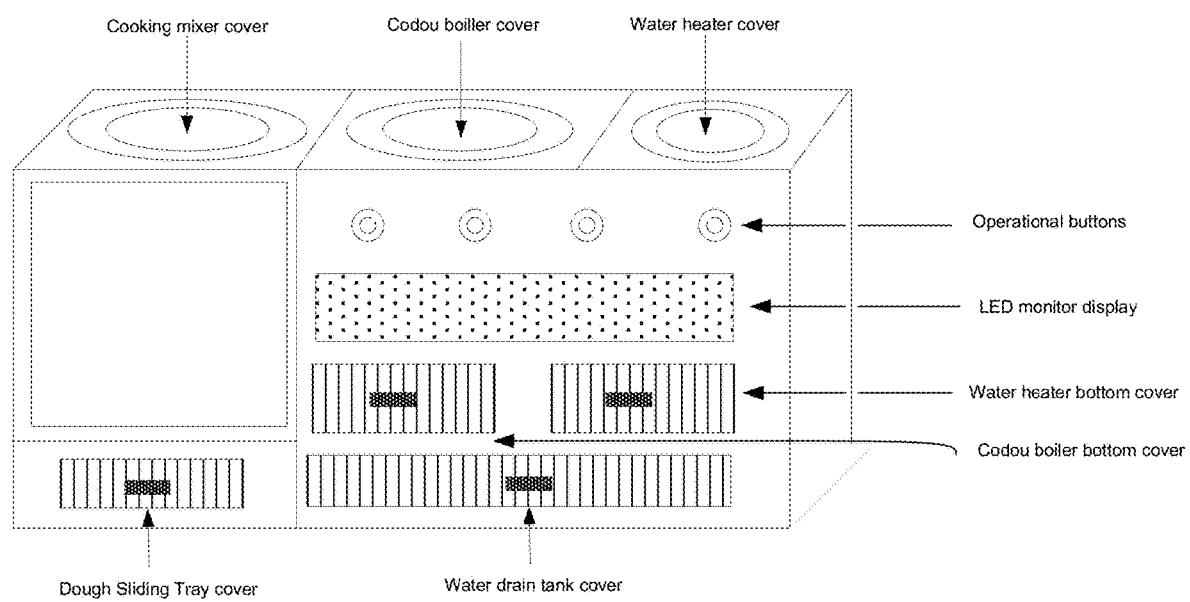
Figure 2: Housing Unit - external view (A)

Figure 3: Cooking Mixer (B)
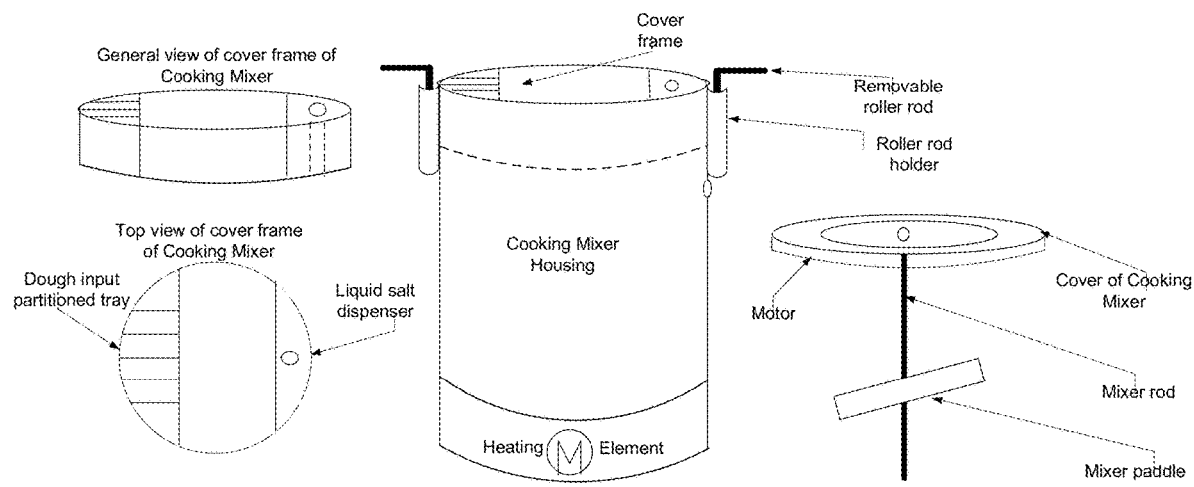

Figure 4: Dough Intake Bowl (B-1)
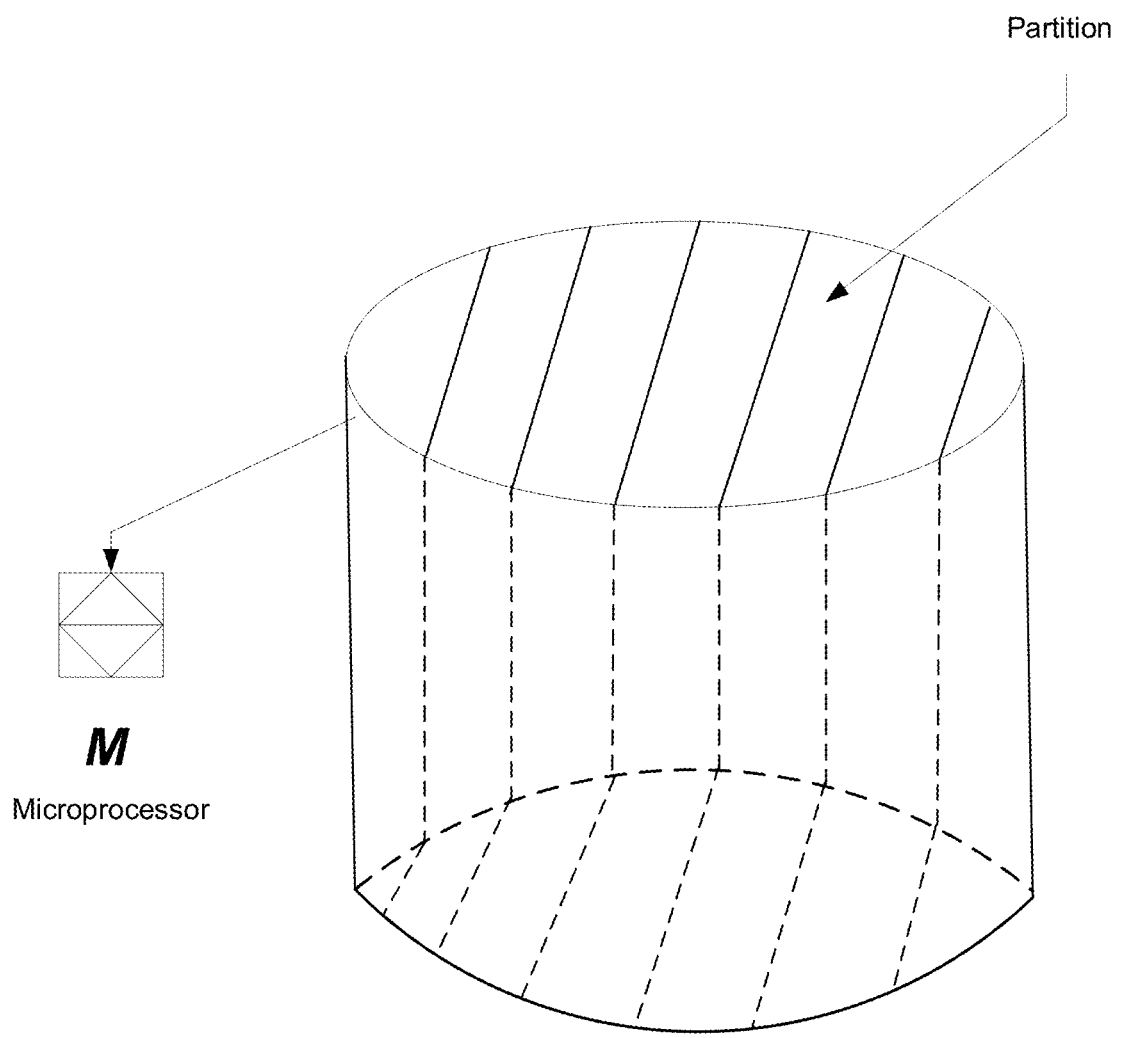

Figure 5: Dough Sliding Tray (C)
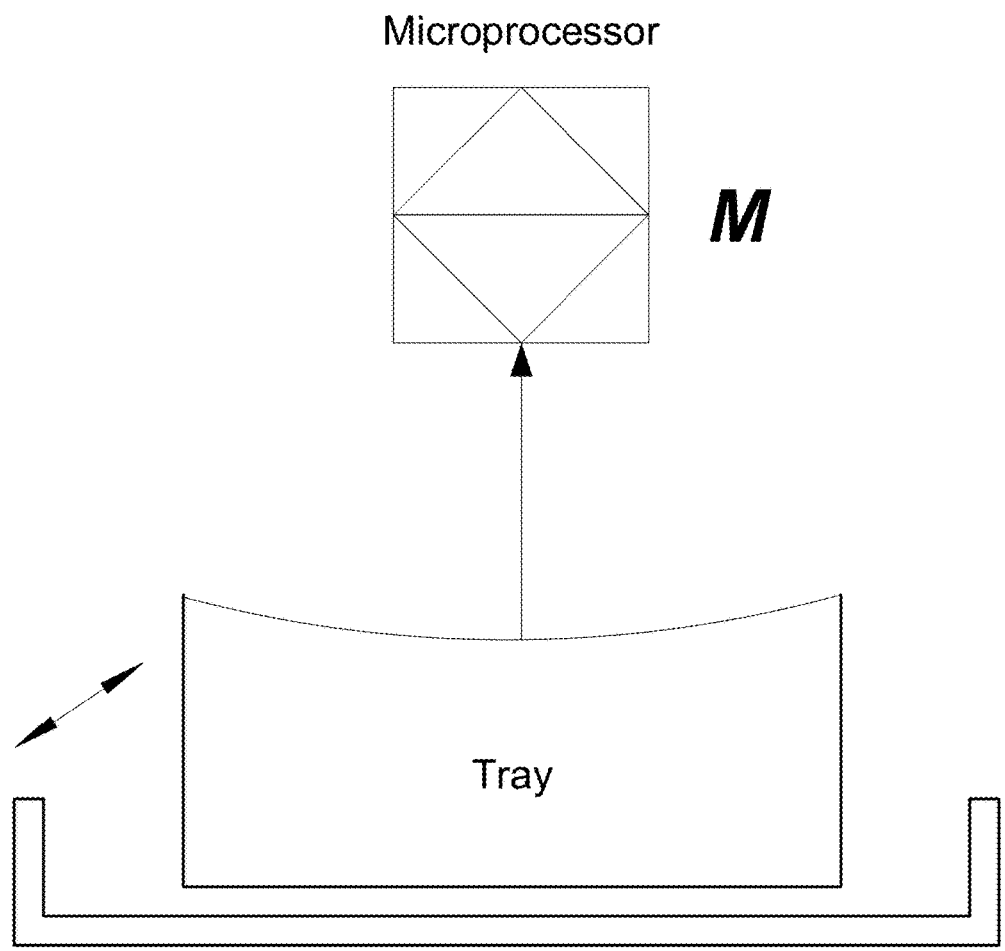

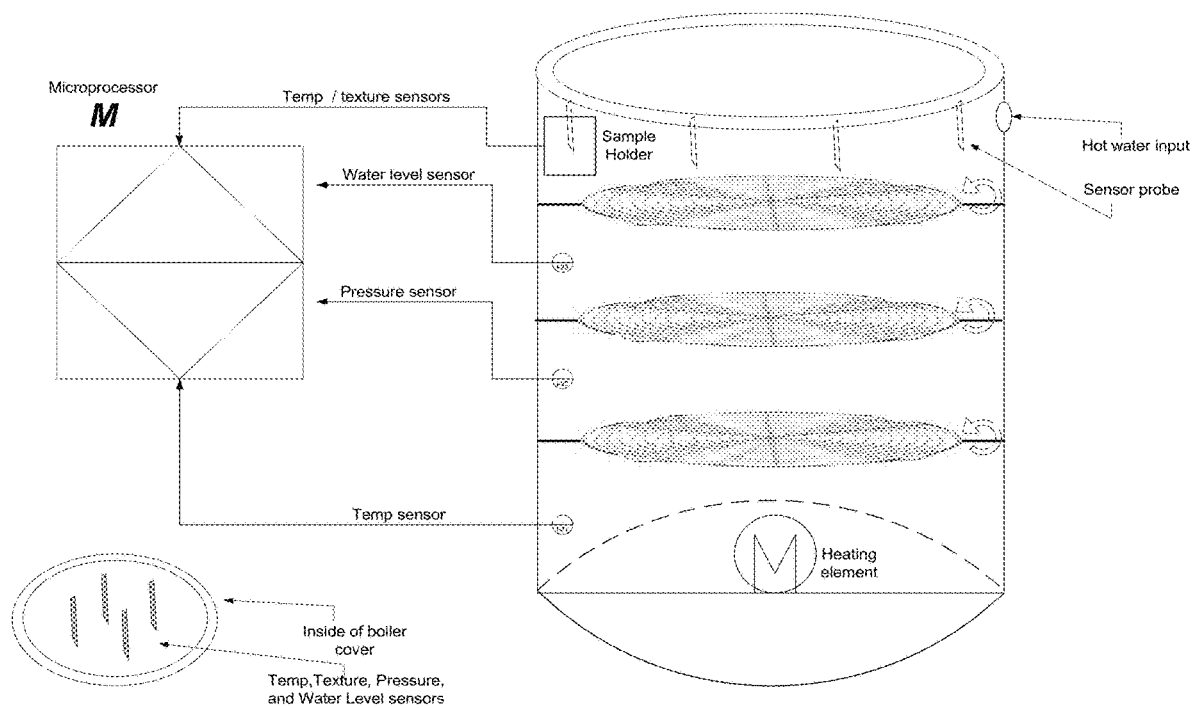
Figure 6: Codou Boiler Container (D)

Figure 7: Water Heater (E)
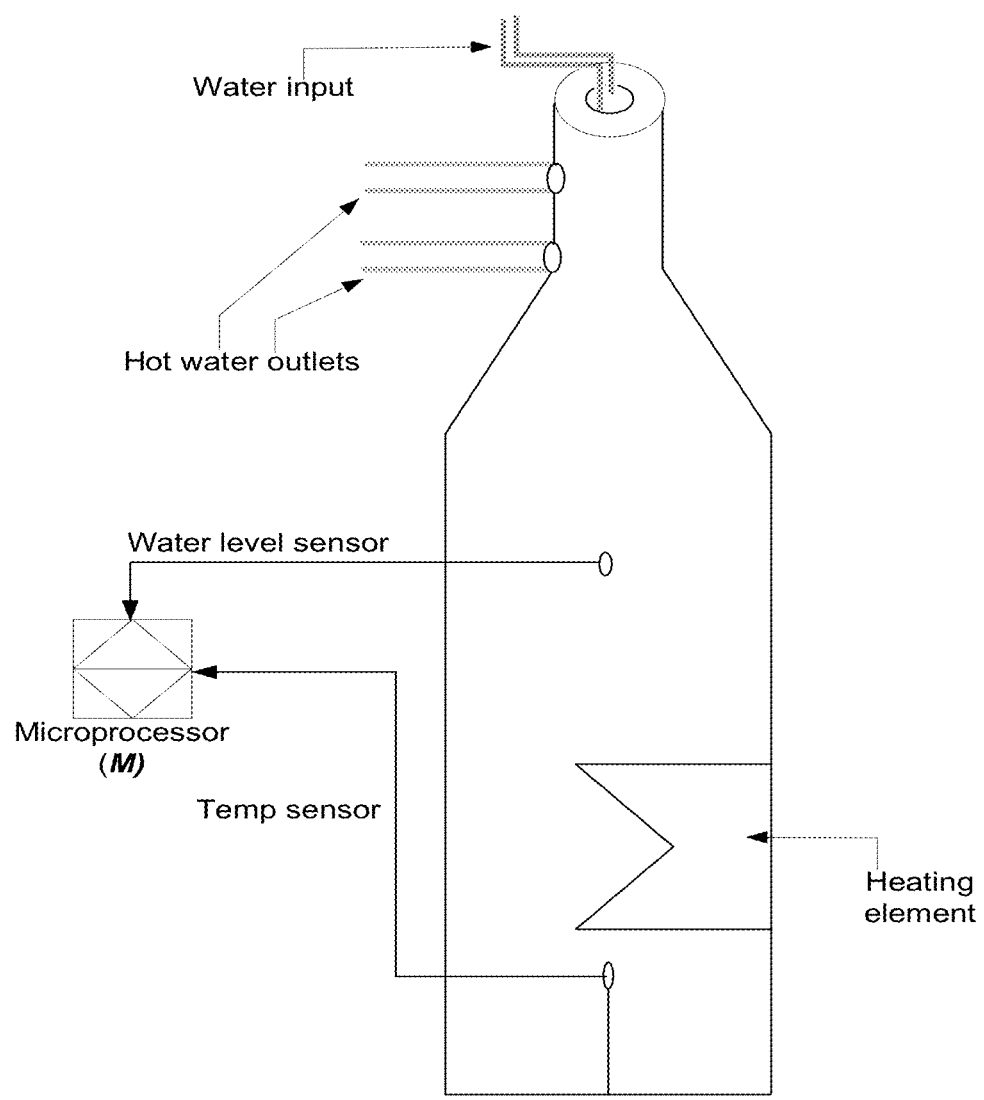

Figure 8: Shaper / Wrapper (F)
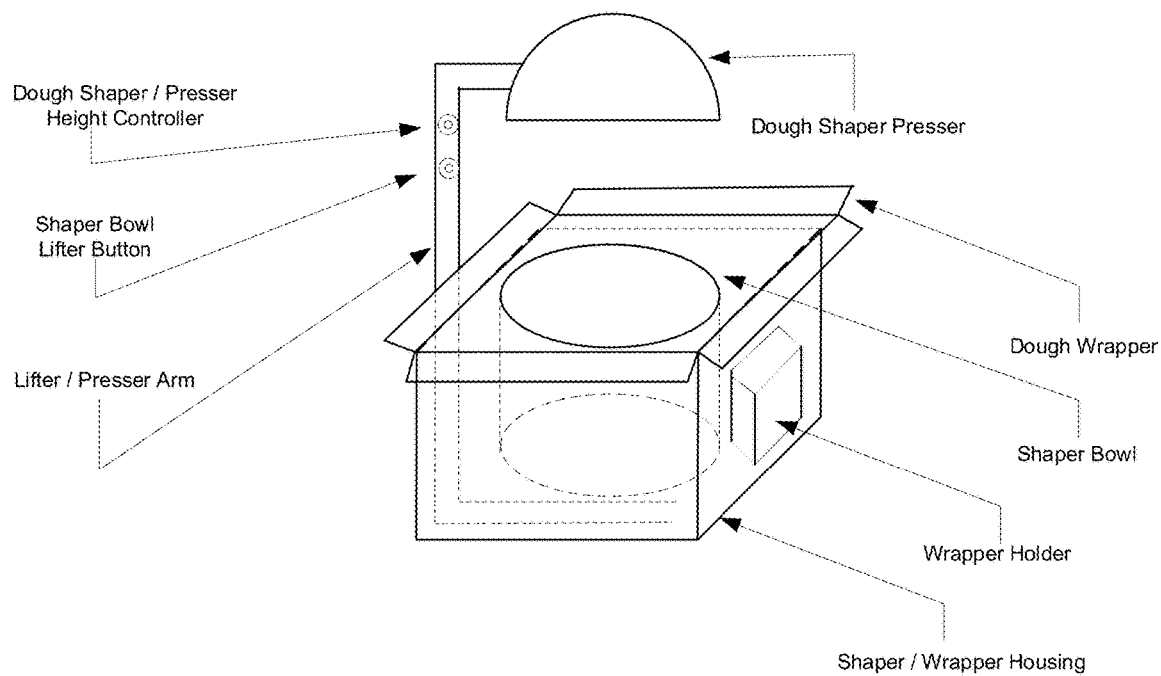

PERFECT COOKER FOR HYDRATED MILLED VEGETABLES

1. BACKGROUND OF THE INVENTION a. Field of the Invention

The present invention relates generally to automated food processors. Most importantly, and more specifically, it relates to an automated system that produces cooked dough (from here on referred to as Codou) of consistent texture, taste, look, and feel every time.

b. Description of the Related Art

This art falls within the general category of automated food processors, which have been around for a while. However, currently, no commercially available personal appliance is capable of consistently creating Codou in the home.

c. Prior Art

There have been some attempts to automate this process using generic or slightly modified food processors, but with very limited success. The failure of the existing prior art is the inability to attain the consistency of texture, taste, look, and feel, resulting in generally unacceptable end-products. This is the most significant differentiation between this invention and the prior art; that is to invent an apparatus that assures consistency of texture, taste, look, and feel; hence a uniquely identifiable product.

2. BRIEF SUMMARY OF THE INVENTION

The current art overcomes the disadvantages suffered by prior art that use slightly modified existing food processors. The present invention is geared towards automating the manual Codou making process, rather than being a generic or modified food processor.

While possessing some features of generic food processors, the present invention contains many new features not found in generic food processors, which result in a novel automated Codou making system. The novelty of this system makes it not obvious nor anticipated; neither is it implied by any prior art whether by itself or in any combination thereof.

The present invention is achieved with an apparatus that comprises a housing unit containing the following components: a partitioned dough intake unit, a liquid salt dispensing unit, a cooking mixer unit, a sliding dough output unit, a shaper/wrapper unit, a boiler unit, a water heater unit, and a microprocessor that polls all sensory devices and controls all processes.

The invention, as described herein and illustrated in the diagrams, is not limited in its application to the construction and or the arrangements of the components as depicted and illustrated. In other words, the invention is capable of other uses and applications, and can be utilized in various other ways. Additionally, the terminology used here is only for illustrative and descriptive purposes, and should not be construed as limiting.

First, it is an object of this invention to provide an automated Codou making system that will significantly reduce the amount of labor required to cook Codou.

Second, it is an object of this invention to produce on a timely and consistent basis the required texture, taste, look, and feel of Codou, depending on the type of Codou selected.

The Codou is usually made from hydrated milled vegetables (such as corn, millet, wheat, etc.) of fine granularity. Since the input dough is already hydrated as part of a soaking or fermentation process, water is not needed to start the cooking/mixing process. However, if a texture softer than the normal is desired, then water can be added through the water dispenser. Salt can optionally be added through the liquid salt dispenser for the desired taste.

There are several varieties of Codou. Most significantly, all of the various types of Codou use the ingredients mentioned above. However, the texture as well as the taste can be different. What is most important is to have the same consistency all the time, once the type of Codou is selected The end product (Codou), is eaten with sauces, gravies, stews, or soups along with desired meat, poultry or seafood.

The prevailing process for preparing Codou is long and tedious, and lacks consistency of texture, taste, look, and feel. As such, it is not a task the average household engages in. Rather, most households prefer to buy from commercial producers. The current crop of commercial producers, for the most part, use manual labor to prepare, shape, wrap, and cook the dough. This manual process results in lack of consistency of the product's texture and taste even from the same producer on a daily batch by batch basis. As such, only a few production houses, who have somehow mastered the production process to constantly attain the desired consistency are heavily patronized by the consuming public.

However, the lack of automation in this mastered process mean that they are unable to produce in the desired quantity to satisfy the vast majority of the consuming public. Consequently, the vast majority of Codou customers have to settle for mediocre products, due to lack of available quality.

Codou is a very popular product consumed by large quantities of people all over the world. The need to automate this process to produce Codou that is consistently tasteful, has the right texture, and easy to make is a need whose time has long passed

3. DETAILED DESCRIPTION OF THE INVENTION a. The Invention

The present invention is achieved with an apparatus that comprises a housing unit containing the following components: a partitioned dough intake unit, a liquid salt dispensing unit, a cooking mixer unit, a sliding dough output unit, a shaper/wrapper unit, a boiler unit, a water heater unit, and a microprocessor that polls all sensory devices and controls all processes.

b. The Process of Making and Using i. Input Raw Dough: the process starts by intake of raw dough (just soaked with water, or fermented with water). The dough is poured into the partitioned dough intake unit ensuring that each of the six partitions are filled to the same depth.

ii. Fill Liquid Salt Dispenser: Ensure that this dispenser is full.

iii. Set Parameters: the various desired parameters are set at this stage.

This includes, but not limited to the following:
1) Type of Codou
2) Texture of the Codou
3) Codou mixture percentage
4) Salt applicability for taste iv. Start Operation: Press the START button to begin the process
1) Microprocessor polls the water level in the Heater and fills it as necessary
2) Microprocessor polls the water temperature in the Heater and heats it to the proper temperature.
3) If Salt addition is required, liquid salt is dispensed into the Cooking Mixture Bowl.
4) Based on the Codou Mixture Percentage chosen (i.e.: 30%), the bottom covers of the intake partitions will open to let that percentage into the Cooking Mixture Bowl.
5) Based on the type and texture of Codou chosen, hot water from the Heater may be dispensed into the Cooking Mixture Bowl.
6) The Mixing Paddle rotates and the Heating Element in the Cooking Mixture device is turned.
7) The cooking mixture keeps operating until the desired temperature and texture are achieved. The cooking mixture stops, and the Heating Element is turned off.
8) The rest of the dough (i.e.: 100%-30%=70%) is now released into the Cooking Mixture Bowl. The Mixing Paddle is re-started but the Heating Element is kept off. The mixing continues until the proper mix has been attained. The Mixing Paddle is turned off.

v. Remove Pre-cooked Dough: the cover of the Cooking Mixture Bowl is snapped up and out removing the Rod and Paddle from the Cooking Mixture Bowl. The Cooking Mixture Bowl is rolled forward using the side rods (this is to enable easy removal of the dough into the Dough Sliding Tray). The Dough Sliding Tray Release Button is pressed to unlock and release this unit, which is then pulled out forward. Using the supplied plastic spoon, the bowl is removed into the Dough Sliding Tray Unit.

vi. Shape/Wrap Dough: Using the stand-alone Shaper/Wrapper Unit, choose your desired wrapper type (plantain leaves, banana leaves, corn leaves, etc.) from the storage unit. Place the wrapper into the Dough Shaper Bowl stretching the wrapper to cover the four corners of the Shaper/Wrapper Housing Unit. Using the supplied Scooper, keep scooping the pre-cooked dough into the Dough Shaper Bowl until it is full. Lift the Shaper Presser Arm up, and fold the four sides of the wrapper then seal the last two sides with the supplied Sealer.

vii. Boil Mixed Dough: Open the cover of the Codou Boiler Unit, drain any water in there into the Water Drain Tank by pressing the Drain Boiler Tank Button. Using the coiled Hose attached to the Drain Tank, place that Hose into a bucket, and press the Empty Drain Tank button until all the water has been drained. Place one of the wrapped doughs into the Sample Holder and insert the texture/temperature sensor into it.

viii. Turn the racks to their horizontal positions and place the rest of the wrapped doughs on them distributing them evenly among the rows of racks, starting from the bottom rack.

ix. Press the "Cook Codou" button x. At the appropriate time a bell will ring signifying the end of the Codou cooking process, and the whole apparatus will be shut down xi. Press the "Drain Water" button.

xii. Wait until the water in the boiler is completely drained, then open the boiler cover.

xiii. Starting from the top Rack, remove all the cooked Codou for immediate consumption and or storage.

4. BRIEF DESCRIPTION OF THE DRAWINGS a. FIG. 1: this composite diagram depicts the inner components of the housing unit, namely: the cooking mixer, the dough sliding tray, the hot water pipes, the microcontroller, the, sensors, the water drain tank, the boiler, and the water heater.

b. FIG. 2: This drawing shows the external view of the housing unit, which contains all the components of the apparatus. The upper cavity has openings to the liquid-salt intake unit, the dough intake bowl unit, and the codou boiler unit; all of which have closures that close during operation. The top section of front casing hosts all the buttons necessary for the operation of the unit. The lower sections of the front casing have a set of drawers that allow the opening of the dough sliding tray outwardly from the housing unit; and the opening of the water drain tank outwardly from the housing unit; the opening of both the bottom draws of the codou boiler and the water heater.

c. FIG. 3: the cooking mixer is one of the components in the housing unit. It consists of sub-components namely:
i. Cover frame, which consists of the liquid salt dispenser, input partition tray, and roller rod. The roller rod is used to tilt the container forward to facilitate the scooping of the pre-cooked dough into the sliding tray.
ii. Heating element
iii. Cover, which houses the motor, and holds the rotating rod and mixer paddle
iv. Hot water Inlet.

d. FIG. 4: the Dough intake unit is a sub-component of the Cooking Mixer. It has six partitions. It receives the dough into the six partitions. Based on the selection of the of the codou type, the partition lets in certain percentages of the raw dough at various times to the mix cooking cycle to achieve the texture of the selected type.

e. FIG. 5: this dough sliding tray is used to hold the pre-cooked mixed dough for wrapping, before further cooking in the boiler f. FIG. 6: the codou boiler container is used to boil the wrapped dough. It comprises an outer container housing multiple rollable racks that hold the wraps in place during the boiling process. It is also equipped with sensors that poll parameters such as temperature, texture, water level, and pressure. Finally, it has a heating element that boils the wrapped codou.

g. FIG. 7: this Water Heater is filled with tap water, and serves as the source of hot water for the codou boiler and the cooking mixer h. FIG. 8: this shaper/wrapper unit is a separate component which is not part of the housing unit. At the end of the cooking mixing phase, the desired wrapper is taken out of the wrapper holder, and inserted into the shaper bowl; the wrapper is then spread to cover the shaper housing on all four sides. The pre-cooked dough is scooped from the sliding tray and placed into the dough shaper bowl until it is full. The dough shaper presser is lowered on top of the dough to press it into shape. The arm is then raised to lift the shaper arm; and the dough is wrapped on four sides, the last two sides sealed with the sealer. The wrapped dough is ready to boil in the boiler container.

What is claimed is:

1. An apparatus for automatically cooking hydrated milled vegetables to achieve consistent look, feel, texture, and taste, wherein the apparatus consists of: a housing unit that contains a number of components that combine to produce cooked dough (Codou); a cooking mixer unit that accepts hydrated milled vegetables through a partitioned intake unit; a sliding tray unit into which the initially mixed pre-cooked dough is poured to serve as a staging platform for shaping and wrapping the pre-cooked dough; a shaper/wrapper unit into which scooped pre-cooked dough is placed, shaped, and wrapped; a water heater unit that takes input from a tap; a boiler unit into which the wrapped pre-cooked dough is placed for boiling; and a microprocessor unit that serves as the master controller for all the operations of the apparatus.

2. The apparatus of claim 1, wherein the intake unit sub-component of the cooking mixer unit will, depending on the type of Codou selected, dispense the raw input in various stages and percentages into the cooking mixer.

3. The apparatus of claim 1, wherein the cooking mixer unit being pulled forward in an angular manner to facilitate scooping the pre-cooked dough into the sliding tray unit.

4. The apparatus of claim 1, wherein a motorized cover/rod/paddle component of the cooking mixer unit mixes the dough and allows for easy removal.

5. The apparatus of claim 1, wherein a liquid salt dispenser unit allows for easy dispensing of salt into the cooking mixer unit.

6. The apparatus of claim 1, wherein the sliding tray upon the press of a button slides outward from the housing unit for use as a staging platform for molding the pre-cooked dough.

7. The apparatus of claim 1, wherein the water heater unit heats the water to pre-determined temperatures, and outputs to the cooking mixer and/or boiler unit on demand.

8. The apparatus of claim 1, wherein the boiler unit with its flipping trays, sensors, and sampler boils the wrapped dough to pre-determined consistent look, feel, texture, and taste.

9. The apparatus of claim 1, wherein a microprocessor controller, among other things, polls water level sensors within the boiler unit, and dispenses hot water from the water heater into the boiler.

* * * * *